United States Patent Office 2,942,045
Patented June 21, 1960

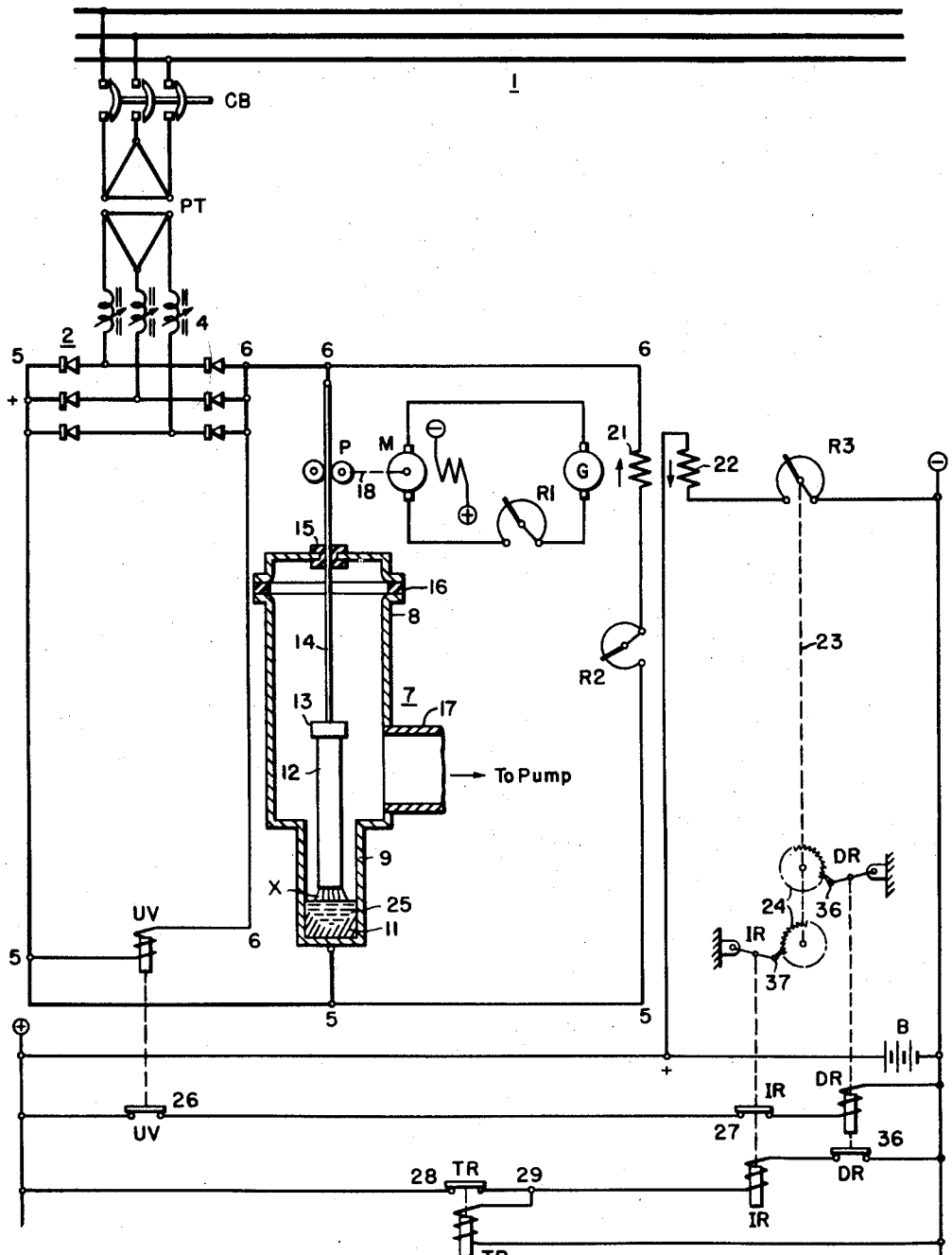

2,942,045

VACUUM ARC FURNACE CONTROL

Edwin W. Johnson, Forest Hills, Pa., assignor to Westinghouse Electric Corporation, East Pittsburgh, Pa., a corporation of Pennsylvania Filed Apr. 30, 1958, Ser. No. 731,927

2 Claims. (Cl. 13—13)

The present invention relates to the control of arc melting furnaces, and more particularly to a method and means for maintaining the optimum length of the arc, or arc gap, in such furnaces.

The invention is particularly intended for the control of consumable electrode arc furnaces of the type shown in my Patent No. 2,743,307, issued April 24, 1956, or furnaces of the same general type, although it will be obvious that the invention, in its broader aspects, is generally applicable to any type of arc furnace or to other arc devices.

In arc melting furnaces of the consumable electrode type, the metal to be melted is supplied in the form of an electrode which is melted by an arc between the electrode and the surface of a molten pool of metal in a crucible. A vacuum may be maintained within the crucible, with the pressure over the melt preferably being as low as possible, such as 0.1 mm. of mercury or less. Such furnaces have many advantages for the melting and casting of many different metals including the so-called refractory active metals such as titanium and zirconium, high-temperature alloys, stainless steels, ordinary steels, and numerous other metals and alloys. The use of vacuum, and the resulting diffuse arc which gives a highly uniform heating of both the electrode surface and the pool, results in very effective removal of impurities and the production of ingots or other castings of improved structure as well as generally better mechanical properties than are obtained in ingots produced by other methods.

A major problem in the operation of arc melting furnaces is the control of the arc length or the arc gap, that is, the distance between the lower end of the electrode and the surface of the pool. The arc cannot be observed directly during operation of the furnace, by any practical means, and it is necessary to provide some means other than visual observation for maintaining the desired arc length.

In arc furnaces, or other arc devices, which operate at atmospheric pressure, or at pressures not greatly reduced below atmospheric, it is customary to control the arc length by the method of maintaining a predetermined arc voltage. At pressures near one atmosphere, the arc plasma is characterized by an appreciable voltage gradient, of the order of about 20 volts per inch, for example. The combined voltage drops at the cathode and anode surfaces amount to about 20 volts additional, so that if it is desired to maintain an arc length of one-half inch, for example, it can readily be done by regulating the electrode position to hold the arc voltage at about 30 volts. This can easily be done with conventional control equipment based on sensing and regulation of the arc voltage, and this method of control has been satisfactorily used with arc furnaces operating at or near atmospheric pressure.

When the arc operates in a vacuum, however, this method of control cannot be satisfactorily used. As the ambient pressure of gas in which the arc operates is decreased, the voltage gradient of the arc plasma also decreases, and at very low pressures such as those which are desirable and frequently used in vacuum arc furnaces, the voltage gradient of the arc plasma may be as low as only one volt per inch, or possibly less. Since the combined anode and cathode voltage drops are relatively constant and amount to about 20 volts, for example, and since there are random, essentially uncontrollable, and variable voltage drops in other parts of the electrical circuit carrying the arc current, such as the consumable electrode, the power supply, the current conductors, and their connections, which voltage drops can amount to several volts, it is obvious that the arc plasma voltage drop may be extremely small in comparison with the total arc circuit voltage. Thus, any attempt to regulate arc length by the method of maintaining a constant voltage drop across the arc and its connecting electrical conductors, including the consumable electrode, is subject to very serious errors and the arc length obtained may be either much greater or much less than the value desired. In vacuum arc furnaces, therefore, the arc voltage alone cannot satisfactorily be used for sensing or controlling the arc length.

The production of a uniform ingot of commercially satisfactory properties, however, demands very careful control of the arc length. If the arc length, or arc gap, is too long, there may be inadequate heating of either the electrode or the melt, or both, with the result that the ingot may be ruined, or at least its quality will be seriously impaired. A long arc is also dangerous, since the terminal of the arc that is normally on the pool may transfer itself to the side-wall of the furnace mold, with the result that this wall may become over-heated, and may be burned through. If the mold is water-cooled, as in most such furnaces, the result of such burn-through will be entry of water into the crucible or mold containing the molten pool, and quite possibly an explosion. Even if no such burn-through occurs, the ingot quality will be seriously impaired as the result of the loss of arc heating of the pool surface. If, on the other hand, the arc is too short, so that the electrode frequently touches the molten pool, the average arc-power is significantly reduced by the resulting arc short-circuits, in each of which the arc-voltage is reduced substantially to zero, so that there is greatly reduced power-consumption for heating the metal. Here, again, both the electrode and the pool will be inadequately heated, with the result that the ingot is ruined, and there is also a strong possibility that the pool will become cool enough to freeze over and weld to the electrode. Moreover, the repeated large changes of current and voltage accompanying these short-circuits may be very damaging to the power supply.

The present invention provides a method of arc length control which is predicated upon the discovery that, even when the arc is operating satisfactorily and producing a highly satisfactory melt or ingot, the arc voltage may decrease momentarily at times from its normal value, which may be about 25 volts, for example, to a somewhat lower value which may, in extreme cases, approximate zero. These momentary dips of the arc voltage apparently occur when occasional drops of molten metal from the electrode bridge across the arc gap and touch both the pool surface and the electrode at the same time, or possibly when the spattering or surface-movement of the pool causes the pool surface to meet a drop of metal which is falling from the electrode. The result is a more or less effective short-circuiting of the arc by the molten metal, and the brief voltage dips observed are herein referred to as arc short-circuits.

As long as the duration and frequency of these momentary short-circuits are not very great, the arc will be operating at its full power at all but a very minor fraction of the time, so that no significant impairment of the heating is involved. If, however, the arc length is permitted to become too short, the frequency of the short-circuits will increase, and the average duration of the short-circuits will become longer, with the result that the average power which is consumed in the arc will decrease, until the ingot is ruined, and, in an extreme case, the electrode becomes welded to the frozen pool.

If the time interval between arc short-circuits is very large, on the other hand, while the arc length is essentially unknown, it is very probably too great. There will then be insufficient heating of both electrode and pool and also a greatly increased probability of the arc leaving the pool, with consequent ruining of the ingot and danger of an explosion, as mentioned above.

Thus, when the arc length lies between the extremes where the frequency of arc short-circuits is too great, on the one hand, and where this frequency is too low, on the other hand, it may be said that the arc length has its optimum value. This optimum arc length may be indicated by a frequency and duration of arc short circuits which are both relatively low, but not so low as to correspond to an excessive arc length, or to produce any uncertainty as to whether or not the arc may be too long. The arc can be maintained at this optimum length, therefore, by regulating the electrode positioning means in such a way that the frequency of arc short-circuiting is kept within a predetermined range. This may be done manually in a procedure whereby the furnace operator continuously observes the arc voltage to note the frequency of arc short-circuits and adjusts the electrode feed rate accordingly, but it is preferred to provide automatic means for sensing the frequency of arc short-circuits and controlling the electrode positioning means to keep the frequency within the predetermined range. The optimum frequency of short-circuiting is not critical and should be high enough only to insure that the arc will not become too long. The exact range of short-circuiting frequency to be maintained, in a given case, is dependent on numerous factors including the diameter of the electrode, the arc power, the metal to be melted, and other particular operating conditions, and is easily computed or estimated when these quantities are known. For example, if the longitudinal rate of electrode consumption is 1 inch per minute, and if the allowable range of the arc length is approximately ½ inch, the short-circuiting frequency required will be of the order of two per minute. Additional improvement of the selection of short-circuiting frequency may be gained from experience.

The principal object of the present invention, therefore, is to provide a method and means for controlling the arc length in vacuum arc furnaces.

Another object of the invention is to provide a vacuum arc furnace in which the arc length is maintained at, or close to, its optimum value by keeping the frequency of occurrence of arc short-circuits within a predetermined range.

A further object of the invention is to provide an automatic control system for arc melting furnaces for controlling the position of the electrode to keep the frequency of arc short-circuits within a predetermined range so as to maintain the arc length at, or close to, its optimum value.

Other objects and advantages of the invention will be apparent from the following detailed description, taken in connection with the accompanying drawing, the single figure of which is a simplified diagrammatic representation of a vacuum arc furnace and control system embodying the invention.

In the drawing, there is shown a three-phase supply-line 1, which supplies power, through a circuit breaker CB, to a power-transformer PT. The transformer is connected to a rectifier assembly 2, shown as a three-phase rectifier bridge, through saturable reactors 4 which are diagrammatically indicated as being adjustable for the purpose of controlling or preselecting the arc-current. The rectifier assembly 2 may be taken as representing any suitable direct-current power supply having a positive output-terminal 5 and a negative output-terminal 6.

The rectifier 2 supplies power to a vacuum arc device shown as a consumable electrode vacuum arc furnace 7. The furnace 7 is shown only diagrammatically since its actual physical construction is not a part of the invention, and it may be of the type shown in my previously mentioned patent or of any other suitable type.

The furnace 7 is shown as comprising a substantially vacuum-tight furnace enclosure 8, the lower part of which forms, or contains, a crucible or ingot mold 9 for an ingot 11 which is to be formed. The mold 9 may be cooled in any suitable manner. The metal to be melted is supplied to the furnace in the form of a consumable electrode 12 which is suspended, as by means of a coupling 13, from the end of an elongated electrode-holder rod 14, which is shown as extending up through a slide-seal member 15 in the top of the enclosure 8, the top being insulated as indicated at 16 so that the electrode-holder rod 14 is electrically insulated from the mold 9. The enclosure 8 is also provided with an evacuating connection 17, which is connected to a vacuum pump so that a vacuum can be maintained in the furnace during operation.

The furnace 7 also includes any suitable adjustable electrode positioning or feeding means, which is capable of adjusting the arc-length, or the position of the lower end of the electrode 12 with respect to the pool or the top of the ingot 11. If the drawing, such an adjustable electrode positioning means is diagrammatically shown as comprising a pinch-roll arrangement P, which is intended to be representative of any means for raising and lowering the electrode-holder rod 14, and hence also the electrode 12. The pinch-roll mechanism P is driven, through a suitable mechanical connection 18, from a feed motor M, which is shown as a direct-current motor. The feed motor M is shown as receiving its power from a direct-current regulator-generator G, which may be of the general type known as a rotary amplifier which has been used in other arc length or arc voltage controlling devices, although the invention is not limited to this particular control or amplification means.

The power supply terminals 5 and 6 are connected to the furnace 7, the polarity preferably being as shown with the negative terminal 6 connected to the electrode 12 (through the electrode-holder rod 14 in the illustrated form of embodiment), and the positive terminal 5 connected to the mold 9.

The direction and the speed of the feed motor M are controlled by the generator G, which has two functions. First, it converts mechanical power into electrical power which drives the motor M, and second, it regulates the speed of motor M according to the value of its output potential, which is in turn approximately proportional to the net excitation provided by the generator field windings 21 and 22. These field windings are connected to their respective power sources in such a way that their magnetic field oppose each other. Hence the generator output voltage, and therefore the speed of the motor M, will be zero when the currents flowing through the two field wings 21 and 22 are such as to produce equal magnetic fluxes. The generator G is normally driven at a constant speed by any suitable mechanical means.

In the illustrated form of embodiment, the generator G is provided with three adjustment means, which are shown in the form of three rheostats R1, R2 and R3, although all three rheostats may not be necessary in all cases. The rheostat R1 is connected in the series armature-circuit of the feed motor M and the generator G, to provide a means for adjusting or quickly controlling the speed at which the feed-motor operates at any given voltage of the generator G.

In the illustrated embodiment, the first field winding 21 of generator G is connected across the electrode 12 and the mold 9, as shown, to be energized by the arc voltage, and the circuit of the field-winding 21 includes the second rheostat R2, so that the amount of generator excitation which is produced by any given arc voltage may be adjusted or controlled. While this field winding 21 is preferably energized in response to the arc-voltage, as shown, it may be energized in response to the value of any other electrical parameter of the arc.

The second field winding 22 of the generator G is energized, through the rheostat R3, across a constant direct-current source, shown diagrammatically as a battery B, which is intended to represent any substantially constant voltage source which can be used as a reference quantity. The separately excited field windings of the motor M may also be connected across the battery B. The field winding 22 is connected to oppose the field winding 21, as indicated above, so that the excitation of the generator G is determined by the difference in excitation of the two opposing field windings. The generator G thus produces a voltage which is determined by the polarity and magnitude of the difference between the field excitations which are produced by the two field windings 21 and 22, so that any inequality between these two excitations will produce a generator voltage of the direction and magnitude necessary to cause the motor M to move the electrode 12 in such a direction as to tend to reduce the inequality. The generator G thus acts as a regulating means which tends to maintain an arc voltage which is equal to a preset value, which is in turn manually controllable by adjustment of rheostat R3. This control of the arc voltage is obtained by powering the electrode feed motor M to continuously move or position the electrode in such a manner that the voltage across the arc is maintained at the preset value.

The generator G and the arrangement described have been shown only as an example of one particular regulating means, and the generator G is to be taken as representing any control or regulating means which responds to the arc voltage, or other parameter of the arc such as current or power, and controls the electrode feed motor M to tend to maintain the arc voltage, or other arc parameter, at substantially a preset value. As previously explained, control systems of this type have been successfully used with arc furnaces operating at or near atmospheric pressure. When the arc is operated under vacuum, however the use of this method of arc length control is more difficult because the voltage gradient in the arc plasma is then much smaller than is the gradient obtained at atmospheric pressure. The sensitivity of operation of the arc voltage regulating control is then very seriously decreased.

In accordance with the present invention, therefore, additional means are provided for controlling the feed motor M to regulate the position of the electrode 12 in such a way that the frequency of arc-short-circuits is maintained close to a predetermined value, or, more generally, within a predetermined range. As previously explained, if the frequency of arc short-circuits is controlled in this way, the arc is kept at, or close to, its optimum length, and satisfactory operation of the furnace is obtained with the result that ingots or castings of superior quality are produced.

The short circuits that are herein referred to are not necessarily of such low resistance as to conduct all of the available current and thus to cause momentary extinguishment of the arc. It is preferable that the short circuits (or molten drops bridging the arc gap) be small, or of comparatively high resistance, so that only a portion of the total available current will flow through each short-circuit while the remaining current continues to flow through the arc. The short-circuit and the arc are thus parallel conductors of the total current. When a short-circuit occurs, therefore, the current passing through the arc must momentarily decrease, becoming zero only if the resistance of the short-circuit is quite low. The arc voltage at a constant arc length is an increasing function of arc current, and therefore the decrease of arc current during a short-circuit is accompanied by a decrease of the arc voltage. The higher the short-circuit resistance, the smaller is the arc current decrease and the smaller is the voltage change. Thus the change of arc voltage during a short-circuit may be quite small and the term "short-circuit" as used herein means any dip in voltage of brief duration whether the voltage dip is large or small.

For the purpose of sensing and maintaining a constant frequency of arc short-circuits, and thus maintaining a constant arc length, the control or regulating means described above is provided with suitable supplementary adjusting means for adjusting the operation of the feed motor to properly position the electrode 12. In the illustrated embodiment, this adjustment might be made by adjusting any one of the three rheostats R1, R2 and R3. By way of illustration, the rheostat R3 is shown as being connected, by a mechanical connection of any suitable type, to a control shaft 23, which is to be taken as representing any suitable adjusting means for providing supplementary adjustment or control of the operation of the feed motor M. It will be obvious that adjustment of the shaft 23 will change the voltage of the generator G and thus adjust the speed of the feed motor M to change the position of the electrode 12 so that the arc length will be maintained at a new value in accordance with the setting of R3.

In operating the furnace 7 in accordance with the invention, therefore, the adjustment shaft 23 may be used to control the electrode feed rate in such a way that the freqeuncy of arc short-circuit is kept close to a predetermined value, or within a predetermined range. This might be done manually as by observing a voltmeter and stopwatch, or a recording voltmeter, to determine the time intervals between short-circuits as indicated by momentary dips of the arc voltage, and manually adjusting the shaft 23 as required to keep the frequency of short-circuits within the desired range. It is preferred, however, to provide automatic means for responding to and regulating the frequency of arc short-circuits, or the time interval between short-circuits, and adjusting the control shaft 23 accordingly, and an illustrative automatic control of this kind is shown in the drawing.

The control system shown is centered around an electrical transient responsive means, which is capable of sensing departures, above or below a preselected value, of the frequency of occurrence of arc short-circuits in the furnace. The arc, as indicated at X, is maintained between the electrode 12 and the surface of the molten pool 25 during the melting operation. The means shown for detecting the occurrence of short-circuits of the arc consists of an undervoltage-relay UV, which is energized across the arc circuit terminals 5 and 6, although it is to be understood that the undervoltage-relay UV may be regarded as representing any means for responding to a sudden change in the value of any electrical parameter which responds to a short-circuited condition of the arc. The undervoltage-relay UV is provided with a contact 26 which is closed when the relay is deenergized or insufficiently energized. The latter condition is obtained when the potential drop across 5 and 6 is below the normal arc voltage, as during an arc short-circuit.

The control system is shown as being energized between a positive bus (+) and a negative bus (—), these two buses being energized from the battery B or other suitable source of control power. The contact 26 of the undervoltage-relay UV connects the postive bus (+) to the operating coil of a resistance-decreasing relay DR, preferably through a normally closed contact 27 of a resistance-increasing relay IR, and thence to the negative bus (—).

There is also provided a suitable timing relay or mechanism TR, which is indicated as a relay which picks up instantaneously in response to the energization of its coil, but which drops out upon deenergization of its coil, only after an adjustable time-interval, as diagrammatically indicated by an adjustable dashpot DP. The timer relay TR is to be regarded as being representative of any timing mechanism which will afford an indication of the passage of a preselected time-interval, which may for example be from 5 to 60 seconds, more or less, the exact time being best determined by experience, in any particular case, as previously explained.

The timer relay TR is provided with a contact 28, which is connected between the positive bus (+) and a circuit 29, which continues through the operating coil of the resistance-increasing relay IR, and preferably also through a contact 36 of the resistance-decreasing relay DR, the circuit being complete at the negative bus (−). The circuit 29 also energizes the operating coil of the timer TR. Thus, the timer TR continuously cycles, and the resistance-increasing relay IR is briefly energized each time the timer TR runs through its preset time-interval.

The two relays DR and IR could be used simply as indicating-devices, for indicating whether the average time interval between successive voltage-dips, or arc short-circuits, is equal to or more or less than the preselected time interval which is set by the timer TR, so that an attendant could manually make whatever adjustments are needed, such as adjusting rheostat R3, to make the average time-interval between recurrent voltage-dips approximately equal to the preselected time-interval, or to maintain a preselected average frequency of arc short-circuits. I prefer, however, to make these adjustments automatically, by utilizing the resistance-decreasing relay DR to increase the energization of the field-winding 22, for example, in response to any and all voltage-dips in the arc; and by utilizing the resistance-increasing relay IR to decrease the energization of the winding 22 at the conclusion of each preselected time interval registered by the timer mechanism TR. When the average time interval between successive short-circuits is just equal to the preselected time interval, therefore, the resistance setting of the rheostat R3 will tend to oscillate continuously, within an average amplitude of only one or two small increments, about a constant value, thus affording a substantially constant speed of the feed motor M.

As a suitable means for effecting the two opposite adjustments, there is shown diagrammatically a ratchet-pawl 36, which is raised upon energization of the resistance-decreasing relay DR, to notch or ratchet the adjustment shaft 23 in the direction which reduces the resistance of the rheostat R3, and another ratchet-pawl 37 which is raised upon energization of the resistance-increasing relay IR, to notch or ratchet said rheostat R3 in the other direction. The ratchet pawls 36 and 37 may actuate the same ratchet wheel 24 or may actuate separate wheels on the same shaft, as diagrammatically illustrated. This particular adjusting means is, of course, representative of any means for accomplishing the desired result, as there are many ways of accomplishing these adjustments.

In operation, the feed motor M drives the electrode 12 downward to maintain the arc voltage as initially preset manually by the rheostat R3 as the electrode is consumed. The timer relay TR continuously increases the speed of the downward movement of the electrode and thus tends to decrease the arc length. This speed increase is carried out in a series of small increments or steps with a predetermined time interval elapsing between the successive steps. The undervoltage-relay UV closes its contact 26 whenever the arc voltage decreases during an arc short-circuit, and causes the speed of the motor M to be decreased, as a consequence of which the arc becomes longer, and the probability or frequency of arc short-circuits is diminished.

It will be apparent that, during the brief time interval while an arc short-circuit exists, the excitation of the generator G provided by the field winding 21 is substantially decreased, and there is a tendency for the motor M to reverse and to raise the electrode rapidly in order to break the short-circuit and restore the arc voltage to the value corresponding to the setting of rheostat R3. The short-circuits that usually occur during the normal operation of this control device are so very brief, however, that there is insufficient time for the motor to actually reverse and lift the electrode. This is because the short-circuits tend to break of their own accord long before it is possible for the motor M to reverse the direction of movement of the electrode. Thus, the predominant effect of the voltage dip obtained during a short-circuit is only to cause the resistance of the rheostat R3 to be decreased, with the result that the average arc length is increased and the electrode feed rate and frequency of arc short-circuits are diminished.

If the average time interval between successive short-circuits is just equal to the preset time interval, the tendency for the arc length to be decreased will just cancel the tendency for it to be increased, and the arc length and electrode feed rate will remain essentially constant. Thus, the overall effect is to provide and maintain a time interval between successive arc short-circuits that is equal, on the average, to the time interval desired and for which the timer relay is set.

Although the above illustrative example of one embodiment of the invention has been described in terms of automatic adjustment of rheostat R3 in accordance with the prevailing short-circuit frequency, it will be apparent that a similar result may be obtained if the control shaft 23 is attached to either of the rheostats R2 or R1 instead of to R3. It can be seen that adjustment of the rheostat R2 affects the speed of the motor M in substantially the same manner and to the same degree as does the adjustment of rheostat R3. The control shaft 23 can therefore be attached to R2 rather than to R3 with essentially equivalent results.

The rheostat R1 provides direct regulation of the speed of the motor M. Since the regulation of this motor speed is also the primary function of rheostats R2 and R3, it will be seen that automatic control of the arc length, the short-circuit frequency and the electrode feed rate may readily be obtained by attaching the control shaft 23 to rheostat R1 rather than to R2 or R3.

It will be seen that the control system involves the combination of an undervoltage relay or arc short-circuit detector UV and a contact-making timing mechanism TR, to provide information as to whether the frequency of occurrence of arc short-circuits is above or below a preselected value which is determined by the setting of the timing mechanism. There is also provided means for automatically increasing the arc length when the frequency of arc short-circuits is, on the average, too great, and means for continuously decreasing the arc length, in a series of steps, when the frequency of arc short-circuits is too low. It will be understood that the particular means shown for effecting these adjustments is only illustrative and that any suitable means may be used.

It will be understood that the phenomenon of recurrent arc short-circuits is a more or less random phenomenon, so that all that can be performed by a system of this kind is that over a period of time, the number of short-circuits experienced will equal the number desired. It will also be understood that the average frequency of short-circuits that is to be maintained is not especially critical, but that any reasonably close approximation of the preselected time interval will suffice for the completely successful operation of the arc-furnace. There may be several minutes of too-frequent arc short-circuits before a serious arc-cooling effect is produced, so that it is possible to run through a number of successive too-frequent arc short-circuits before the frequency of occurrence of arc short-circuits is restored to the desired value. Likewise, it is quite feasible to run through several normal time-interval periods of operation, with arc short-circuits too infrequent, before the frenquency is restored more nearly to the desired value.

At the close of an ingot-melting and casting operation, it is usually necessary to decrease the arc current gradually, so that the molten pool 25 which forms at the top of the ingot 11 will freeze slowly, from the bottom upward, so as to minimize the formation of a frozen crust over the top of the pool while there is still molten metal underneath. This requirement is well known, and can be provided for by adjustment of the saturable reactors 4 in the supply-circuit to the rectifier 2.

The beginning and ending periods of a melting and casting operation are particularly difficult, with reference to the maintenance of a suitable arc-length, and my arc short-circuit frequency response mechanism is useful then, as well as during the intermediate period when the ingot is building up at a more or less steady rate. It may be necessary to resort to manual adjustments, at the beginning and at the end of a furnace-operation, and this is provided for by the rheostats R1 and R2 which can be manually manipulated, so as to override the automatic response at these periods; or automatic means might be devised, for accomplishing these special adjustments, without departing from the broad principles of my invention.

The invention has been described with particular reference to vacuum arc furnaces of the consumable electrode type. It is to be understood, however, that the invention is not limited to this particular type of furnace but that it may also be used in connection with vacuum arc furnaces employing non-consumable electrodes, and may have applications to arc furnaces operating at or near atmospheric pressure and to other types of arc devices for heating or melting metal such as some types of welders. It will also be understood that, although a particular embodiment of the invention has been shown and described for the purposes of illustration, it is not limited to the particular arrangement shown.

I claim as my invention:

1. An electric arc furnace comprising a substantially vacuum-tight enclosure, means for containing a molten pool of metal within said enclosure, an electrode within the enclosure, means for maintaining an arc between the electrode and the surface of said pool, feed means for the electrode constructed and arranged to continuously position the electrode to maintain a desired position of the electrode with respect to the surface of the pool, the electrode position being such that the arc is subject to momentary short-circuits between the electrode and the pool, means for detecting the occurrence of arc short-circuits, timing means for establishing a desired time interval between successive arc short-circuits, and adjusting means actuated by said detecting means and said timing means for controlling the position of the electrode to keep the average time interval between short-circuits close to said desired time interval.

2. An electric arc furnace comprising a substantially vacuum-tight enclosure, means for containing a molten pool of metal within said enclosure, an electrode within the enclosure, means for maintaining an arc between the electrode and the surface of said pool, feed means for the electrode constructed and arranged to continuously position the electrode to maintain a desired position of the electrode with respect to the surface of the pool, the electrode position being such that the arc is subject to momentary short-circuits between the electrode and the pool, means for detecting the occurrence of arc short-circuits, adjustable timing means for establishing a desired time interval between successive arc short-circuits, adjusting means for controlling the position of the electrode, means for actuating the adjusting means in a direction to increase the length of the arc in response to the occurrence of an arc short-circuit, and means to actuate the adjusting means in successive timed steps in a direction to decrease the length of the arc in response to operation of the timing means, whereby the average time interval between arc short-circuits is kept close to said desired time interval.

References Cited in the file of this patent

UNITED STATES PATENTS

| 2,026,943 | Kennedy et al. | Jan. 7, 1936 |
| 2,743,307 | Johnson | Apr. 24, 1956 |
| 2,798,107 | Boron et al. | July 2, 1957 |

FOREIGN PATENTS

| 264,851 | Great Britain | July 14, 1927 |
| 474,493 | Canada | June 12, 1951 |